W. L. PETERSON.
SEEDER ATTACHMENT FOR CULTIVATORS.
APPLICATION FILED APR. 5, 1921.

1,414,580.

Patented May 2, 1922.
2 SHEETS—SHEET 1.

Inventor
W. L. Peterson

By Philip A. H. Ferrell
Attorney

W. L. PETERSON.
SEEDER ATTACHMENT FOR CULTIVATORS.
APPLICATION FILED APR. 5, 1921.

1,414,580.

Patented May 2, 1922.

UNITED STATES PATENT OFFICE.

WALTER L. PETERSON, OF LYONS, NEBRASKA.

SEEDER ATTACHMENT FOR CULTIVATORS.

1,414,580.  Specification of Letters Patent.  Patented May 2, 1922.

Application filed April 5, 1921. Serial No. 458,662.

*To all whom it may concern:*

Be it known that WALTER L. PETERSON, a citizen of the United States, residing at Lyons, in the county of Burt and State of Nebraska, has invented certain new and useful Improvements in Seeder Attachments for Cultivators, of which the following is a specification, reference being had therein to the accompanying drawing.

The invention relates to seeder attachments for cultivators and has for its object to provide a device of this character which may be easily and quickly applied to a cultivator beam and operated by the spokes of the wheels of the cultivator.

A further object is to provide a seeder comprising a receptacle having a vertically disposed shaft therein, said shaft being operated through gearing, which gearing is rotated by horizontally disposed arms cooperating with the spokes of the wheel of the cultivator. Also to provide a horizontally disposed star shaped scatterer, into pockets of which the seed pass from the receptacle, said pockets having one of their sides open whereby as the star shaped scattered rotates in one direction, the seed will be thrown out of the pockets, and when rotated in the other direction will be retained within the pockets.

A further object is to provide a shield whereby seed will be prevented from being deposited back of the cultivated ground.

With the above and other objects in view the invention resides in the combination and arrangement of parts as hereinafter set forth, shown in the drawings, described and claimed, it being understood that changes in the precise embodiment of the invention may be made within the scope of what is claimed without departing from the spirit of the invention.

In the drawings:—

Figure 5 is a vertical longitudinal sectional view through the lower portion of the seeder.

Figure 6 is a horizontal sectional view taken on line 6—6 of Figure 5.

Figure 7 is a detail perspective view of a portion of the regulating slide for regulating the feeding of seed from the receptacle to the scatterer.

Figure 2:
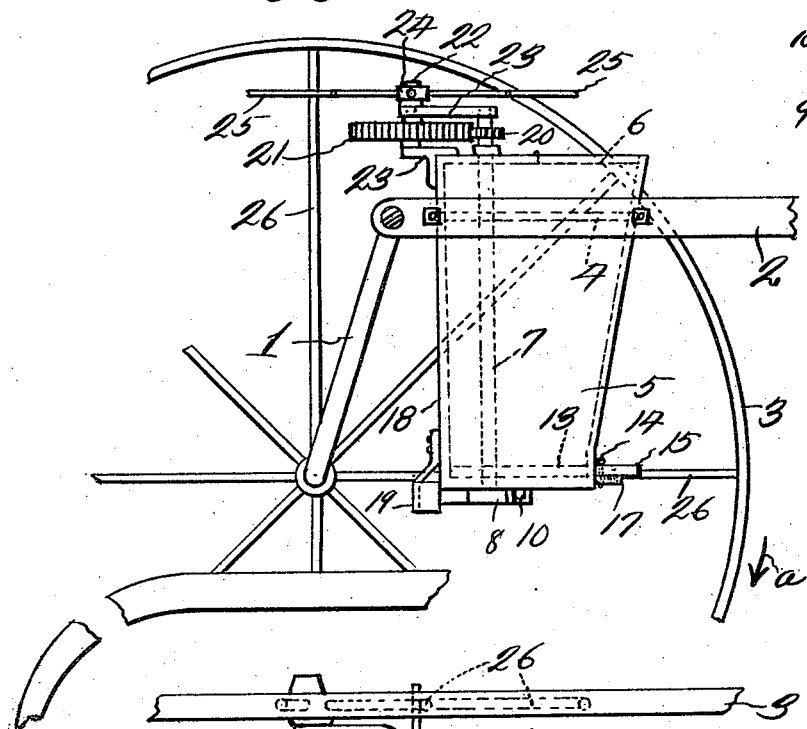
Figure 2 is a vertical longitudinal sectional view taken on line 2—2 of Figure 1.
Figure 3:
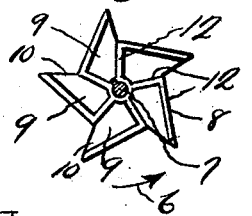
Figure 3 is a top plan view of the star shaped scatterer.
Figure 4:
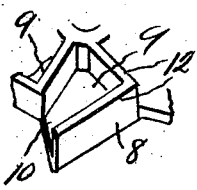
Figure 4 is a detail perspective view of a portion of the scatterer.
Figure 1:
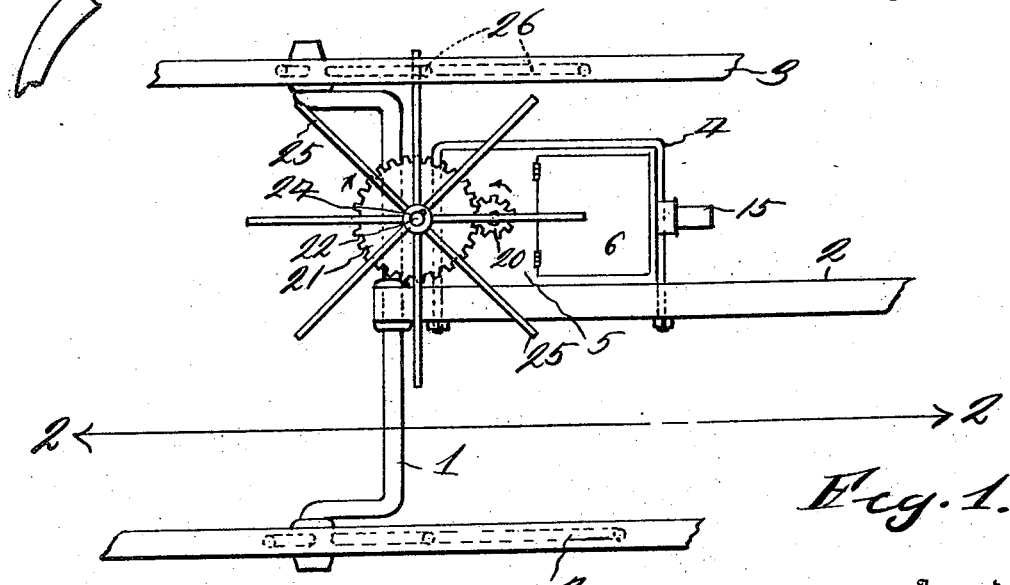
Figure 1 is a top plan view of the seeder, showing the same applied to a cultivator, of the wheeled type.

Referring to the drawings, the numeral 1 designates a conventional form of wheeled cultivator and 2 the beam thereof. The cultivator is supported on wheels 3 of the conventional type, which wheels rotate in the direction of the arrow $a$, as the cultivator moves over the ground during a cultivating operation. Detachably secured to the beam 2 by means of a U-bolt 4 is a seed receptacle 5, which receptacle is vertically disposed, and is provided with a hinged cover 6 whereby access may be had to the interior of the receptacle 5 for placing seed therein. Extending vertically through the receptacle 5 and having bearings in the upper and lower ends thereof is a shaft 7, to the lower end of which is secured a star shaped scatterer 8, which scatterer when the shaft is rotated rotates in the direction of the arrow $b$. The scatterer 8 is provided with a plurality of pockets 9, which pockets are opened as at 10. It will be seen that as the scatterer 8 is rotated in the direction of the arrow $b$ that the centrifugal force will cause the seed which drop into the pockets 9 through the aperture 11 in the bottom of the receptacle 5, to be forced outwardly from the pockets 9 through the open ends 10 of said pockets, thereby thoroughly scattering the seed during the cultivating operation. However upon a rearward movement of the cultivator, the scatterer 8 will be reversely rotated and on account of the angularly disposed walls 12 of the scatterer, said seed within the pockets 9 will be prevented from leaving said pockets. The feeding of the seed from the receptacle 5 to the pockets 9 of the scatterer 8 may be controlled in any suitable manner, however, for purposes of illustration an apertured slide 13 is disposed in the bottom of the receptacle 5, which slide may be adjusted in various positions by means of a pin 14 which passes through the arm 15 and any one of the apertures 16 of the arm 17 carried by the receptacle 5. Secured to the rear side 18 of the receptacle 5 is a U-shaped shield 19, which shield during the rotation of the scatterer 8 prevents seed from being thrown rearwardly of the cultivated ground.

The shaft 7 extends upwardly through the upper end of the receptacle 5 and is provided with a small gear 20, which gear meshes with a large gear 21 carried by a vertically disposed shaft 22. The vertically disposed shaft 22 is rotatably mounted in bearings of brackets 23, which brackets brace the parts and maintain the gears 20 and 21 in mesh. Secured to the upper end of the shaft 22 is a sleeve 24, which sleeve is provided with a plurality of horizontally disposed arms 25, which extend through the wheel 3, and are engaged by the spokes 26 when the wheel 3 is rotated. It will be seen that as the wheel 3 rotates in the direction of the arrow $a$ that the large gear 21 will be rotated and as the gear 21 meshes with the small gear 20 the shaft 7 will also rotate, and in turn rotate the scatterer 8. By providing the gear 20, which is of smaller diameter than the gear 21, it will be seen that the shaft and scatterer will be revolved at a rapid speed thereby obtaining sufficient speed for the scatterer to thoroughly scatterer the seed.

From the above it will be seen that a seeder is provided which may be easily and quickly attached to a conventional form of wheel cultivator and so constructed that the same may be operated by the wheel of the cultivator.

The invention having been set forth what is claimed as new and useful is:—

The combination with a seeder hopper, of a scatterer carried by a vertical shaft and disposed below and in engagement with the lower side of the hopper, said scatterer comprising a star shaped member having a plurality of points, radially disposed vertical ribs on said member emerging from the center and terminating at the apices of the angles between the points, recesses between said ribs and extending into said points, a rib extending from the end of said first named ribs to the points of the star shaped member respectively, whereby the recesses form pockets, bounded on one side by said last mentioned ribs and open on the other side, and whereby during the rotation of the star shaped member in one direction seed will be scattered, and upon rotation of the star shaped member in the other direction the seed will be prevented from being scattered.

In testimony whereof I hereunto affix my signature.

WALTER L. PETERSON.